3,336,844
PISTONS FOR ENGINES WITH A HIGH THERMAL LOAD
André Cornet, 31 bis Rue Louise Michel, Levallois-Perret, France
Filed Aug. 25, 1964, Ser. No. 391,950
5 Claims. (Cl. 92—224)

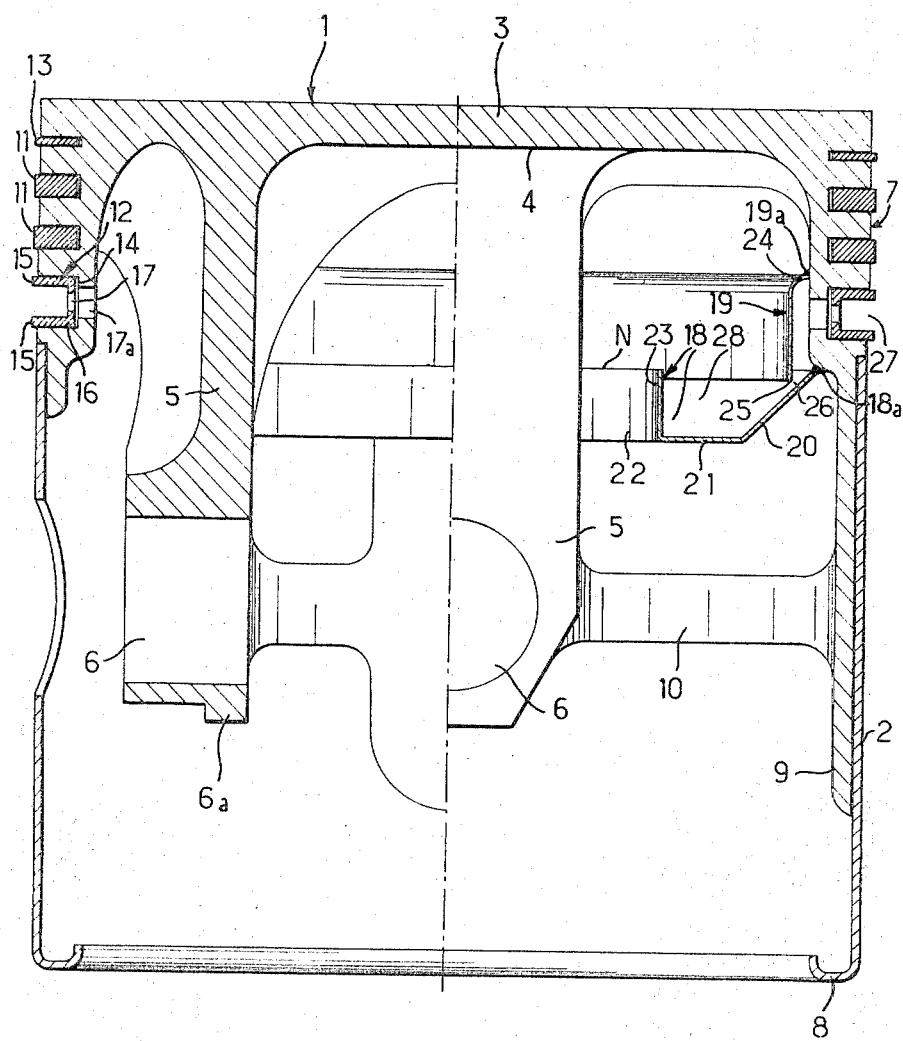

The present invention concerns the pistons of internal combustion engines and relates more particularly to engines with a high thermal load.

The high thermal loads which are imposed more and more frequently on internal combustion engines create several problems, which are all the more difficult to resolve since the engines are sometimes of the poly-fuel type.

These problems are partly the result of the contradictory demands which have to be met in the various parts of the piston, chiefly in connection with mechanical resistance, shock resistance, flexibility, good resistance to corrosion under hot conditions, and ease in manufacture, machining and assembly.

High thermal loads also increase the risk of the packing rings clogging and make the rings less effective since a good clearance must initially be provided between the wall of the cylinder and the packing rings.

On the other hand the increase in the thermal load makes it necessary to improve the cooling of the head of the piston.

With a view to resolving these various problems the present invention proposes a piston for an engine with a high thermal load, comprising a head and a skirt which are made separately and assembled together. The materials from which these two elements are made can thus be chosen according to the characteristics required from each of them.

The shape of the elements and the method of joining them enable them to resist mechanical effects without impairing their flexibility and also facilitate the evacuation of heat from the hottest zones.

Cooling of the piston head is also activated by a device enabling the oil scraped off the wall of the cylinder to be used as a cooling agent before being returned to the sump.

Finally, the invention provides a protective device designed to shield the packing rings from the waste products of combustion and to prevent them from becoming clogged.

A piston according to the invention is distinctive in comprising a head made, preferably by moulding, from malleable cast metal with a white core and a skirt made of sheet steel, the two elements being assembled by jointing and interlocked by brazing.

The moulded head comprises two integrating bosses in which bearings are left to receive the gudgeon pin. The bosses are connected directly to the internal face of the bottom of the piston and are free from any direct contact with the skirt or with the ring-carrying annulus at the head. The head may also have two strips in the form of cylindrical sectors starting from the ring-carrying annulus and serving as a bearing for the internal face of the skirt. The two strips are diametrically opposed to one another in a direction perpendicular to the axis of the gudgeon and bear on the bosses.

According to another feature of the invention the piston head carries a scraping ring having a U-shaped section open towards the outside, the bottom of the U containing perforations located opposite holes in the ring-carrying annulus; the oil scraped off the wall of the cylinder by the ring runs into an annular trough placed opposite the bottom of the piston, and the movements of the piston make it sprinkle the bottom thereof before returning to the sump.

According to the invention the piston—as already stated—also comprises a protective device located between the combustion chamber and the packing rings. The device takes the form of a ring substantially thinner than the packing rings and equal or almost equal in length to the internal circumference of the cylinder at the maximum operating temperature of the engine.

The characteristics and advantages of the invention will become apparent from the description which will now be given. This refers to the accompanying drawing, the one figure of which shows a piston according to the invention. In the figure the two axial half-sections from left and right are taken respectively at the axis of the small end and perpendicularly thereto.

The drawing shows a piston comprising a head 1 and a skirt 2. The head 1, which is moulded, comprises a piston bottom 3, the internal face 4 of which gives rise to two bosses 5 in which are formed bearings 6 to receive the piston pin of the small end of the connecting rod. The lower portion of the bosses may have a thickness 6a serving as a starting point for machining and enabling the weight to be balanced by removing metal.

The ring-carrying annulus of the piston, shown at 7, is jointed to the sheet steel skirt 2, the bottom of which is stiffened by an annular flange 8. The head and skirt are assembled by welding or brazing.

The ring-carrying annulus 7 of the piston comprises two extending strips 9 diametrically opposed to one another in a direction perpendicular to the axis of the small end. The strips 9, connected to the bosses 5 by cross pieces 10, are in close contact with the internal face of the skirt 2 and stiffen the zones of the skirt which have to stand up to those components of the force exerted by the rod which are perpendicular to the axis of the piston.

The strips 9 also constitute a means of evacuating and diffusing the heat to which the head of the piston is exposed.

This assembly has the advantage of leaving all complicated shapes to the moulded member 1, machining of this member being facilitated by the fact that the skirt 2 is a separate part. The fact that the bosses 5 are connected to the actual surface of the piston botttom 3 increases the flexibility of the head in the crititcal zone at the junction of head and skirt. This flexibility stems from the fact that the bosses 5 are clear of the skirt 2 and are also clear of a substantial portion of the ring-carrying annulus adjacent said skirt, as may be seen from the drawing. The strips 9 provide an extremely effective support for the zones of the skirt most exposed to the oblique forces from the rod while allowing the skirt to retain its flexibility. This flexibility makes it possible to avoid the seizing up which would result from excessive rigidity in the places most exposed to forces and dispenses with the need for providing cavities, backed-off portions and ovalisations, the means generally used in an attempt to compensate for the effect of forces acting in these places.

The strips 9 are particularly useful in the case of engines with a high load. In such engines the rod reactions resulting from the shocks of the explosion reach a size such that there is reason to spread them over a relatively small sector of skirt to avoid flexion strains and make the skirt as thin as possible. Suitable distribution of the reactions is effectively produced by the elements 9, 10 which provide a direct point of support to the sectors of skirt subjected to the highest pressures. The head 1 is preferably made of malleable cast metal with a white core. This metal can easily be cast into thin sections, welds well, has a high mechanical resistance of the order of 45 kg. per square mm., a coefficient of elongation of 15% to 18% and very good resistance to corrosion under hot conditions. It is also favourably priced. White cored cast metal welds better than black cored or spheroidal graphite cast metal. Although less resistant than the latter it is less costly and easier to cast into thin sections. It also has these two latter advantages in comparison with cast steel.

Recent processes for annealing in a gaseous oxidizing atmosphere, very effective for reducing carbon, increase the opportunities for using white cored cast metal.

As for the sheet steel skirt, it may be made from a tube or from a sheet rolled and welded or by stamping.

It has already been mentioned above that strong thermal loads are particularly harmful to the behaviour of the piston packing rings shown at 11 in the figure.

The rings must be capable of free displacement in their groove at all temperatures. Consequently a wide clearance is necessary in the depth of the groove and over the external diameters of the piston face, more particularly in the first annular zone at the top, which is subjected to the highest temperatures.

All residual waste products of vaporization such as poly-sulphides, tars, soot, etc. are then stuck by the action of heat in the space between the piston face and the cylinder. This space is particularly large in the case of pistons made of light alloy, whose co-efficient of expansion is far higher than that of the material used for the cylinder. Such clogging prevents the first ring from expanding freely and makes it stick in its groove, after which, with this ring no longer acting as a seal, the other rings in turn undergo the same effect. The result is the seizing up and even the breakage of the first rings.

As a remedy for this various palliatives has already been used, such as incorporating a ring of cast metal in the metal, applying surface treatment, machining multiple grooves to form a heat screen and, above all, machining the first groove in a zone very remote from the top of the piston.

These various means necessarily involve spreading out the rings over a large portion of the piston, which has the effect of reducing the corresponding portion of the skirt which is most useful for guiding, without thereby completely eliminating the disadvantages mentioned above.

The present invention provides a ring of which the function is not to ensure imperviousness but to protect the packing rings from the danger of clogging.

It will be seen from the drawing that the packing rings 11 are located between a scraping ring 12, to which further reference will be made, and a ring 13 known as the protective ring and located very close to the external face of the piston head.

The protective ring 13 is thus deliberately located in a very hot zone of the piston head and made of a material having heat resistance, for example a steel of suitable type possibly with a surface coating such as chromium plating or the like.

The thickness of the ring measured along the axis of the piston is substantially smaller than that of the rings 11. It may be about one-third or one-fifth of the latter thickness. The clearance at the section through the ring is calibrated cold so that its circumferential length at maximum operating temperature causes the ring to close, the length then becoming equal to the internal circumference of the cylinder at that temperature.

Experience shows that a protective ring thus arranged provides good protection for the packing rings 11 from the dangers of clogging. Protection is ensured in any case so long as the protective ring does not become clogged in its groove and so long as it keeps its elasticity. However, as the results of experiments have been favourable and in view of the fact that the protective ring was placed in the zone most exposed to the waste products of combustion, it is permissible to assume that the ring continues to exert its protective function even after becoming clogged. Clogging may be thought to occur when the protective ring is in the extended position in which it has the form of a perfect circle, in which case any clearance existing at temperatures below maximum operating temperature is uniformly distributed over the periphery.

The part played by the strips 9 in cooling the piston head has already been noted. The invention also proposes a complementary cooling device consisting of equipping the inside of the piston head with means for collecting the lubricating oil flowing over the wall of the cylinder, the means being open towards the bottom of the piston so as to allow the collected oil to be projected.

These means chiefly consist of providing an annular trough in the piston head to receive the oil through orifices in the piston wall communicating with the cylinder. The trough receives the lubricating oil scraped off the wall of the cylinder by a ring or other appropriate member, and at each movement of the piston the oil is projected onto the inside of the bottom of the piston head, sprinkling the latter and drawing off excess heat, before dropping into the sump through the central opening.

This equipment of the piston allows the piston head to be continuously and effectively cooled. It is simple and easy to provide on new pistons or to mount on existing ones.

Referring to the drawing, a scraping ring 12 of U-shaped section will be seen engaged in a peripheral groove 14.

The ends of the fins 15 of the scraping ring 12 are in contact with the wall of the cylinder (not shown) while its base 16 contains holes 17 opposite the passages 17a which are formed radially in the wall of the ring-carrying annulus 7. It will be noted that an operating clearance is provided between packing or scraping rings 11 or 12 and the bottom of the grooves carrying them. The device according to the invention for recovering and projecting oil comprises two elements 18, 19, the external configuration of which mates with the internal structure of the piston. The element 18, which is fixed, for example welded as at 18a, to the inside of the ring-carrying annulus 7, is a trough and comprises a portion 20 inclined substantially at 45°, a base 21 with a central hole 22 having a raised edge 23. The second element is a baffle 19 which is welded to the annulus 7 by a flange 24 as at 19a. Together with the inclined plane 20 the free end 25 of the element 19 forms an annular passage 26 which allows oil to circulate. Each of elements 18, 19 may consist of several segments having a free space therebetween opposite bosses 5 as shown on the left-hand side of the drawing.

During the descending movement of the piston the film of oil covering the wall of the cylinder is returned towards the sump (not shown) by the scraping ring 12. However, during this descending movement a certain amount of oil passes inside the annular housing 27 formed by the scraping ring 12 and is evacuated through the respective passages 17a, 17, 26 to accumulate in the reservoir 28 formed by the trough 18 up to a level N, this level being limited by the raised edge 23 and defined so that it is at a lower level than the inlet passage 16. Baffle 19 is placed opposite annular housing 27 and is operative, by virtue of its shape as shown on the drawing, in directing toward trough 18 the oil entering the piston from said housing.

It will be observed that the annular passage 26 is as small as possible although sufficient space is left for the passage of the scraped-off oil discharged.

Because of this arrangement the oil contained in the trough and subjected to intensive mixing while the engine is operating cannot be returned to the inlet passage 26. It is projected on to the bottom of the piston, which is cooled before dropping through the orifice 22 into the sump.

The embodiment chosen and illustrated by way of example does not of course have any restrictive character and may be modified in various ways without thereby going beyond the scope of the invention.

In particular, the stiffening strips 9 may be separate stamped parts which are positioned and brazed at the same time as the skirt.

The protective ring may be in several thicknesses placed in one and the same groove. It is also possible to provide a plurality of protective rings located in successive annular grooves.

The protective rings according to the invention may be applied to any type of piston and their usefulness is not restricted to the piston with a moulded head and separate skirt described above.

What I claim is:

1. A piston for an internal combustion engine comprising a cylindrical molded head of a first type of material, said head consisting of a bottom and a ring-carrying annulus and a skirt made of a second type of material and rigidly attached to said ring-carrying annulus, said head having a plurality of bosses integrally joined to the internal face of its bottom, said bosses being positioned so as to be clear of said skirt and of a substantial portion of said ring-carrying annulus adjacent said skirt and having pivot bearings for the connection of the small end of a connecting rod, said head further comprising a pair of rigidly connected diametrically opposed extensions extending in a direction parallel to the piston axis and against which said skirt bears, said extensions being centered on a radial plane of said piston perpendicular to the axis of said pivot bearings.

2. A piston as recited in claim 1, further comprising a plurality of cross-pieces connecting said extensions to said bosses.

3. A piston as recited in claim 1, wherein said extensions are integral with said molded head.

4. A piston as recited in claim 1, wherein said head is made of malleable cast metal having a white core and said skirt is made of steel.

5. A piston as recited in claim 1, wherein said bosses are clear of a peripheral portion of said ring-carrying annulus adjoining said skirt.

References Cited

UNITED STATES PATENTS

| | | | |
|---|---|---|---|
| 2,051,547 | 8/1936 | Crist | 92—216 |
| 2,077,688 | 4/1937 | Gottlieb | 92—224 |

MARTIN P. SCHWADRON, *Primary Examiner.*

G. N. BAUM, *Assistant Examiner.*